(12) United States Patent
Sandberg et al.

(10) Patent No.: US 12,283,742 B2
(45) Date of Patent: Apr. 22, 2025

(54) ANTENNA MOUNTING BRACKET (71) Applicant: Telefonaktiebolaget LM Ericsson (publ), Stockholm (SE)

(72) Inventors: Jan Sandberg, Frillesås (SE); Gilbert Johansson, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/285,410

(22) PCT Filed: Apr. 19, 2021

(86) PCT No.: PCT/EP2021/060022
§ 371 (c)(1),
(2) Date: Oct. 3, 2023

(87) PCT Pub. No.: WO2022/223091
PCT Pub. Date: Oct. 27, 2022

(65) Prior Publication Data
US 2024/0178544 A1    May 30, 2024

(51) Int. Cl.
*H01Q 1/12* (2006.01)
*F16M 13/02* (2006.01)
(52) U.S. Cl.
CPC .......... *H01Q 1/125* (2013.01); *F16M 13/022* (2013.01); *F16M 2200/021* (2013.01)
(58) Field of Classification Search
CPC ....... H01Q 1/125; F16M 11/18; F16M 13/022
See application file for complete search history.

(56) References Cited

U.S. PATENT DOCUMENTS

| 3,434,780 | A |   | 3/1969 | Bolden |            |
|-----------|---|---|--------|--------|------------|
| 3,945,015 | A | * | 3/1976 | Gueguen | H01Q 1/125 |
|           |   |   |        |         | 343/912    |
| 4,251,819 | A | * | 2/1981 | Vickland | H01Q 1/125 |
|           |   |   |        |         | 343/912    |
| 4,644,365 | A | * | 2/1987 | Horning | H01Q 1/125 |
|           |   |   |        |         | 343/882    |

(Continued)

FOREIGN PATENT DOCUMENTS

| CN | 112259955 A | 1/2021 |
| CN | 212626067 U | 2/2021 |

(Continued)

OTHER PUBLICATIONS

International Search Report and Written Opinion for International Patent Application No. PCT/EP2021/060022, mailed Jan. 25, 2022, 10 pages.

*Primary Examiner* — Bradley Duckworth
(74) *Attorney, Agent, or Firm* — Withrow & Terranova, PLLC (57) ABSTRACT

An antenna mounting bracket for pivotably mounting a directional antenna to a fixed structure, the antenna mounting bracket comprising a fixed part arranged to be attached to the fixed structure and a pivotable part arranged to hold the directional antenna, wherein the pivotable part is pivotably attached to the fixed part about a first pivoting axis A, and where a pivoting angle of the pivotable part relative to the fixed part is arranged to be controlled by an alignment member comprising a differential screw mechanism.

14 Claims, 4 Drawing Sheets

(56) References Cited

U.S. PATENT DOCUMENTS

| | | | | |
|---|---|---|---|---|
| 4,800,394 | A * | 1/1989 | Homann | H01Q 1/125 |
| | | | | 343/882 |
| 4,980,697 | A * | 12/1990 | Eklund | H01Q 1/125 |
| | | | | 343/882 |
| 7,050,012 | B2 * | 5/2006 | Chen | H01Q 1/125 |
| | | | | 343/882 |
| 7,095,378 | B1 * | 8/2006 | Paquette | H01Q 1/125 |
| | | | | 343/757 |
| 7,113,144 | B2 * | 9/2006 | Lin | H01Q 1/125 |
| | | | | 343/882 |
| 7,164,391 | B2 * | 1/2007 | Lin | H01Q 1/125 |
| | | | | 343/882 |
| 9,136,582 | B2 * | 9/2015 | Lewry | H01Q 1/125 |
| 10,079,423 | B2 * | 9/2018 | Asrokin | H01Q 1/1264 |
| 10,411,340 | B2 * | 9/2019 | Ligander | F16M 11/126 |
| 11,575,195 | B2 * | 2/2023 | Dembinski | H01Q 1/084 |
| 11,901,607 | B2 * | 2/2024 | Udagave | H01Q 1/125 |
| 2016/0294036 | A1 * | 10/2016 | Christie | H01Q 3/06 |
| 2020/0350673 | A1 * | 11/2020 | Ligander | H04B 17/12 |
| 2021/0328322 | A1 * | 10/2021 | Walker | F16B 2/12 |
| 2024/0136698 | A1 * | 4/2024 | Kolokotronis | H01Q 1/1264 |

FOREIGN PATENT DOCUMENTS

| | | | |
|---|---|---|---|
| FR | 2252663 | A1 | 6/1975 |
| WO | 2014135190 | A1 | 9/2014 |
| WO | 2017167352 | A1 | 10/2017 |
| WO | 2017174113 | A1 | 10/2017 |

* cited by examiner

ANTENNA MOUNTING BRACKET

This application is a 35 U.S.C. § 371 national phase filing of International Application No. PCT/EP2021/060022, filed Apr. 19, 2021, the disclosure of which is incorporated herein by reference in its entirety.

TECHNICAL FIELD

The present disclosure relates to mounting brackets for mounting antennas to fixed structures such as masts, buildings, and lamp posts. The mounting brackets are particularly suitable for use with directive antennas in microwave radio link applications.

BACKGROUND

A microwave radio link is a highly directive point-to-point radio link used, e.g., for backhauling traffic from a cellular access radio base station to a core network, or for fibre replacement in high speed data traffic applications. The directive antennas are designed to have narrow main lobes which provide high antenna gain.

The directional antennas of a microwave radio link are often attached to fixed structures, for example masts, building walls or light-posts, by means of a mounting bracket. In addition to securing the antenna to the fixed structure, the mounting bracket also provides an alignment function, where an operator can adjust a pointing direction of the main lobe towards the far end antenna. It is of great importance that this alignment is done properly, since even a small alignment error will result in a loss of signal power and a resulting reduction in the signal to noise ratio (SNR) of the microwave radio link.

As the carrier frequencies used for microwave radio links increase, the beam width of the antenna main lobes become more narrow. Antenna alignment then becomes more accuracy demanding because the impact of an alignment error on SNR increases. Since antenna alignment is a manual task, where a technician often needs to climb a mast and at the same time handle tools and safety harness, antenna alignment is becoming more and more of a challenge.

WO 2017/174113 A1 describes an improved antenna mounting bracket, where gear screws are used to facilitate adjustment of the main lobe pointing direction. However, there is a continuing need for better antenna mounting brackets. In particular, there is a need for an antenna mounting bracket which can be used to efficiently align directive high gain microwave radio link antennas.

SUMMARY

It is an object of the present disclosure to provide improved antenna mounting brackets and systems which facilitate antenna alignment of highly directive microwave radio link antennas. This object is at least in part obtained by an antenna mounting bracket for pivotably mounting a directional antenna to a fixed structure. The antenna mounting bracket comprises a fixed part arranged to be attached to the fixed structure and a pivotable part arranged to hold the directional antenna. The pivotable part is pivotably attached to the fixed part about a first pivoting axis, where a pivoting angle of the pivotable part relative to the fixed part is arranged to be controlled by an alignment member comprising a differential screw mechanism. This way a technician can use the differential screw mechanism to fine-tune the antenna alignment with high accuracy in a convenient and efficient manner. The differential screw mechanism can be designed to provide high mechanical robustness in a cost efficient manner. Also, the differential screw mechanism can be added to existing designs with a minimum of structural changes to the bracket, which is an advantage. The fixed part can be arranged to be attached to a wide variety of different structures such as antenna masts, buildings, or fixed objects in a traffic infrastructure.

According to aspects, the pivotable part is arranged to hold one or more directive microwave disc antennas and/or one or more directive microwave antenna arrays. The antenna mounting brackets discussed herein are versatile in the sense that they can be used to hold many different types of antennas without major structural changes to the bracket, which is an advantage since this reduces the variety of mounting brackets required by a microwave radio link operator.

According to some aspects, the antenna mounting bracket comprises a primary pivoting angle adjustment mechanism and a secondary pivoting angle adjustment mechanism, where the primary pivoting angle adjustment mechanism is configured for course adjustment of the pivoting angle, and where the differential screw mechanism forms part of the secondary adjustment mechanism which is configured for fine adjustment of the pivoting angle. This combination of a course alignment mechanism and a fine alignment mechanism provides both a large span of different angles in which the antenna can be pointed, and at the same time a fine-tuning ability which allows the pointing direction of the antenna to be tuned with high precision in a convenient manner.

According to some other aspects, the differential screw mechanism comprises a first and a second externally threaded portion arranged to mate with respective internally threaded portions of a joining member. This joining member provides both a mechanically robust design and a simple adjustment mechanism, which is an advantage. The joining member optionally comprises externally threaded portions arranged to mate with respective locking nuts, where the externally threaded portions are arranged compressible by the locking nuts to provide an increase in the prevailing torque of the differential screw mechanism. This prevailing torque makes sure that the antenna alignment stays fixed once secured, which is an advantage. The joining member optionally also comprises a section arranged to mate with a tool configured to rotate the joining member about an axis of rotation parallel to the extension direction. This means that the differential screw mechanism can be operated by a regular spanner tool, which is an advantage since no special tools are required to perform the antenna alignment.

According to aspects, the differential screw mechanism comprises a visible scale configured to indicate a state of the differential screw mechanism. This visible scale simplifies antenna alignment since it provides guidance to an operator indicating the current fine-tuning applied by the differential screw mechanism.

According to further aspects, the alignment member comprises an at least partially threaded rod extending through an aperture formed in the pivotable part, where the aperture and the rod are asymmetrically formed to prevent rotation by the rod in the aperture. This prevention of rotation further simplifies use of the antenna mounting bracket.

The object is also obtained by a method for aligning an antenna. The method comprises obtaining an antenna mounting bracket for pivotably mounting a directional antenna to a fixed structure. The antenna mounting bracket comprises a fixed part arranged to be attached to the fixed structure and a pivotable part arranged to hold the directional antenna. The pivotable part is pivotably attached to the fixed part about a first pivoting axis, where a pivoting angle of the pivotable part relative to the fixed part is arranged to be controlled by an alignment member comprising a differential screw mechanism. The method further comprises attaching the fixed part to a fixed structure, attaching the pivotable part to a directive microwave antenna, performing a course adjustment by pivoting the pivotable part relative to the fixed part, and performing a fine adjustment by means of the differential screw mechanism. This way antenna alignment is improved since both a course adjustment and a fine-tuning are used to optimize the antenna alignment with respect to a far-end antenna or other target pointing direction.

The object is furthermore obtained by a method for adapting an antenna mounting bracket to support high accuracy alignment. The method comprises obtaining an antenna mounting bracket for pivotably mounting a directional antenna to a fixed structure. The antenna mounting bracket comprises a fixed part arranged to be attached to the fixed structure and a pivotable part arranged to hold the directional antenna. The pivotable part is pivotably attached to the fixed part about a first pivoting axis, where a pivoting angle of the pivotable part relative to the fixed part is arranged to be controlled by an alignment member. The method also comprising replacing the alignment member by an alignment member comprising a differential screw mechanism. This way an existing antenna mounting bracket can be updated to support fine-tuning by means of the differential screw mechanism.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
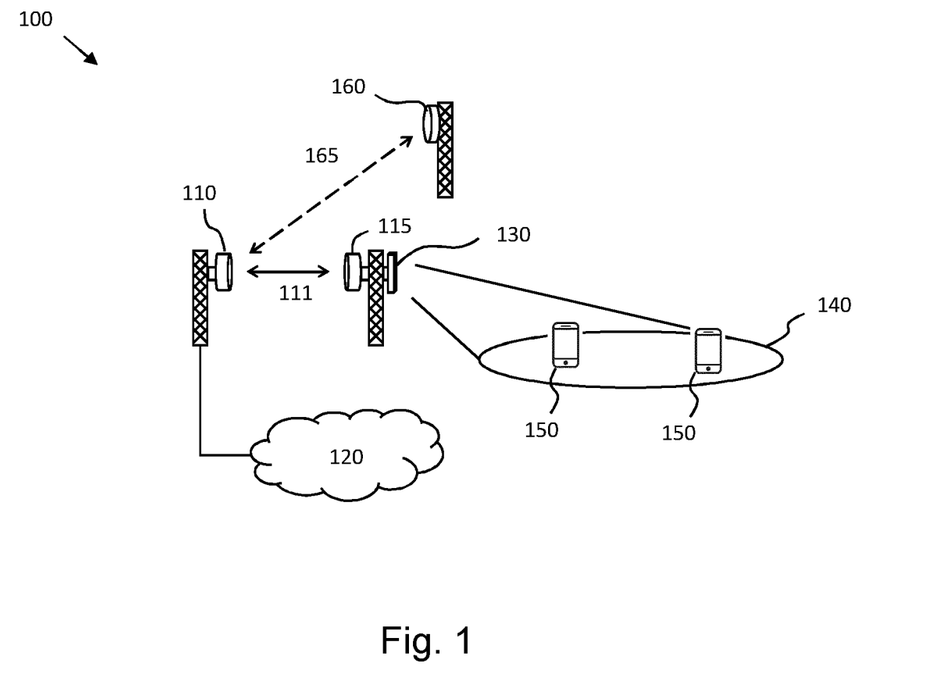
FIG. 1 illustrates a communication network, FIG. 2 schematically illustrates alignment of a directive antenna.

FIG. 1 illustrates an example communication system 100 comprising one or more radio base stations 130 configured to serve a number of wireless devices 150 comprised in a cellular coverage area 140. The communication system 100 may be a fourth generation (4G), fifth generation (5G) or even a sixth generation (6G) network defined by the third generation partnership program (3GPP), or some other type of communication network. It is appreciated that the techniques disclosed herein are not limited to any particular type of communication system but can be applied in most wireless systems comprising microwave radio links.

A microwave radio link 111 between microwave radio link antennas 110, 115 is used to backhaul data traffic between the wireless devices 150 and a core network 120. A microwave radio link transceiver is, generally, a radio transceiver operating at high carrier frequency, e.g., above 28 GHz, and arranged with a highly directive antenna to provide a stable, high throughput, data connection between two fixed points. A microwave radio link is often referred to a point-to-point microwave radio link for these reasons.

Microwave radio link antennas have to be carefully aligned with respect to the far end antenna so as to not negatively affect signal-to-noise ratio (SNR) over the link, and also to not generate interference 165 to other radio transceivers 160. As carrier frequencies increase, the lobe widths of microwave radio link antennas tend to become more narrow, because of the reduced wavelengths involved. The more narrow the main lobe of the directive antenna becomes the more careful the alignment must be in order to not reduce radio link performance. This is because the antenna gain of a narrow main lobe antenna decreases faster with angle compared to a more wide lobe antenna.

Figure 2:
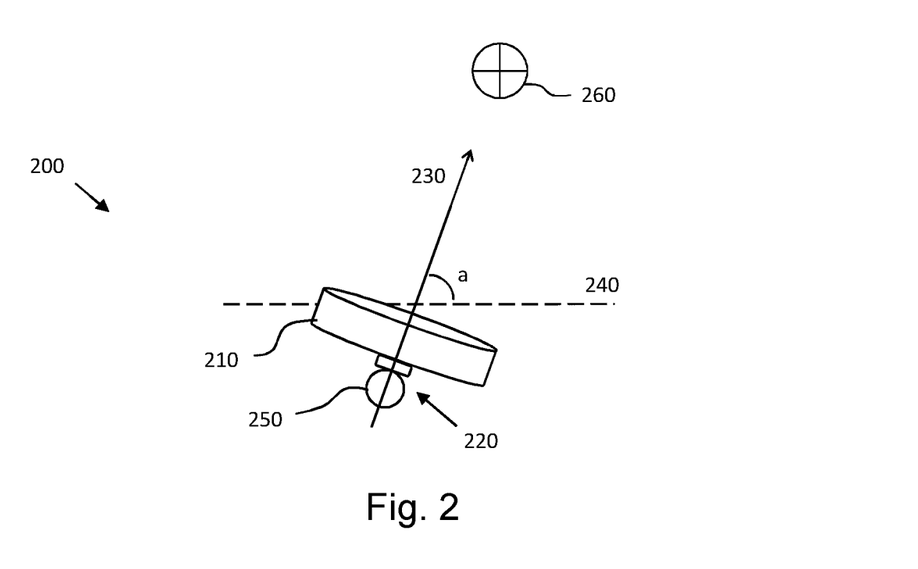

FIG. 2 schematically illustrates an example antenna alignment scenario 200, where a directive antenna 210, here shown as a disc antenna, is to be aligned with respect to a far end antenna 260. The antenna 210 is pivotably attached to a fixed structure 250 by means of an antenna mounting bracket 220 which allows adjustment of the antenna pointing direction 230 in terms of a pivoting angle a with respect to some reference plane 240.

The mounting bracket 220 comprises some form of alignment member which can be used by a technician to configure the pivoting angle a and then lock the antenna in place relative to the fixed structure 250 and thus also to the reference plane 240. The technician usually receives some form of feedback information from the radio system, such as a voltage reading which is proportional to received signal strength. This feedback information can be used to optimize the pivoting angle a to maximize, e.g., received signal strength or SNR. In case the alignment mechanism does not allow for fine-tuning, the technician may have difficulty in performing the optimization properly, especially i a small mismatch results in large penalty in terms of, e.g., SNR. Another issue with known antenna mounting brackets is that the pivoting angle sometimes changes when the pivoting angle of the mounting bracket is locked in position. Thus, the technician first carefully aligns the antenna, and then fixes the pointing direction by some form of locking means, which results in a change in pointing direction and consequently in an SNR penalty of the microwave radio link which is undesired.

A differential screw is a mechanism used for making small, precise adjustments to the spacing between two objects. A differential screw uses a spindle with two screw threads of differing leads (in case of a single lead equal to the thread pitch), and possibly opposite handedness, on which two nuts move. As the spindle rotates, the space between the nuts changes based on the difference between the threads. These mechanisms allow extremely small adjustments using commonly available screws and are possible to manufacture in a cost efficient manner. A differential screw mechanism using two nuts incurs a relatively high friction and therefore requires more torque to turn than a simple, single lead screw with an equivalent pitch.

Many differential screw configurations are possible. For instance, different threads can be configured in a rod and sleeve arrangement, or on two "nuts" co-axially arranged in a single fixture with two separate screws of slightly different pitches entering from opposite ends. U.S. Pat. No. 343,478 A shows an example micrometer caliper based on a differential screw mechanism.

Figure 3:
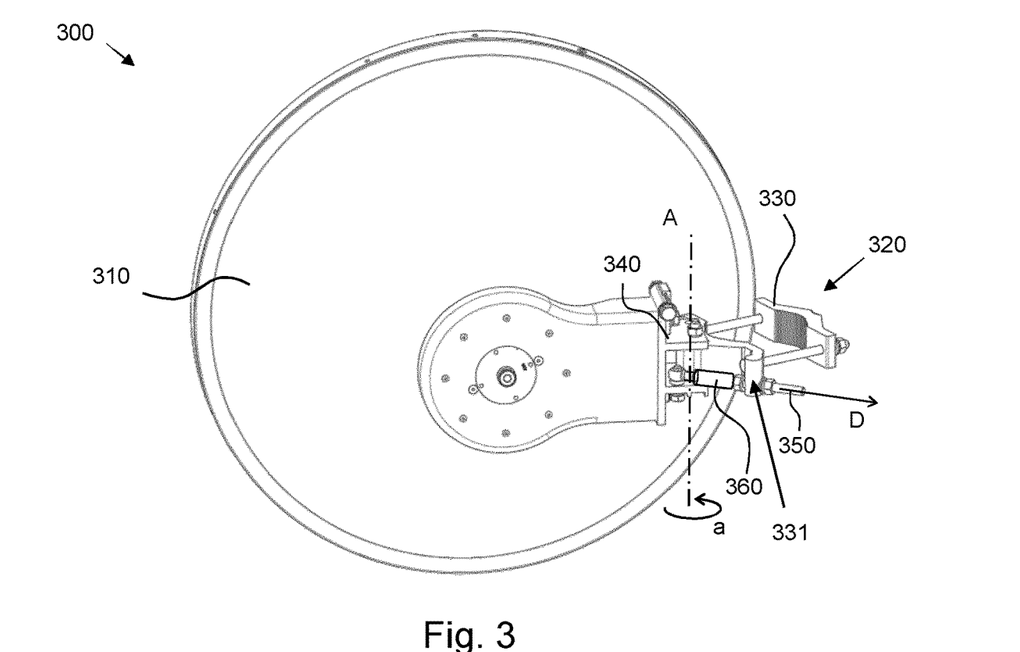
FIGS. 3-4 illustrate details of an example mounting bracket.

It has been realized that a differential screw mechanism can be used with advantage in an alignment member of an antenna mounting bracket. FIG. 3 illustrates an example antenna mounting bracket 320 for pivotably mounting a directional antenna 310 to a fixed structure such as an antenna mast, a building, or a fixed object in a traffic infrastructure. The antenna mounting bracket comprises a fixed part 330 arranged to be attached to the fixed structure and a pivotable part 340 arranged to hold the directional antenna 310. The fixed part may, e.g., comprise a mast bracket as shown in FIG. 3, or some other form of bracket like a plate with bolt holes for securing the mounting bracket to a fixed structure.

FIG. 2 shows a disc antenna, which is commonly used in microwave radio link applications due to its inherent high gain and low cost. However, the mounting brackets discussed herein may very well be used to hold other types of antennas, such as antenna arrays comprising a plurality of antenna elements. Such antenna arrays may be in the form of a planar panel or rounded structures. It is also appreciated that the disclosed antenna mounting brackets can be used to hold multi-antenna arrangements for, e.g., line-of-sight (LOS) multiple-input multiple-output (MIMO) applications, as discussed in, e.g., WO 2014/135190 A1, and WO 2017/167352 A1. In this case the distance between the two or more antennas on the mounting bracket may also be adjustable.

The pivotable part 340 is pivotably attached to the fixed part 330 about a first pivoting axis A. Thus, a technician can adjust the pivoting angle a in order to align the pointing direction of the antenna in, e.g., azimuth dimension, with respect to some far end antenna location or other suitable pointing direction. Antennas such as that shown in FIG. 3 can often also be aligned about a second pivoting axis. A mechanism for adjustment about such a second pivoting axis will be discussed below in connection to FIG. 7.

The pivoting angle a of the pivotable part 340 relative to the fixed part 330 of the mounting bracket is arranged to be controlled by an alignment member 350. This example alignment member comprises a threaded rod extending in extension direction D which is arranged articulated on the fixed part 330, here by a ball joint. The threaded rod extends through a hole 331 formed in the pivotable part. Thus, as the pivoting angle changes, the position of the threaded rod in the hole changes, i.e., the rod moves back and forth in the hole.

The threaded rod can be fixed in the hole in a desired position by opposing locking nuts 332, 333, (shown in more detail in FIG. 4) which can also be used to force the rod to move during course alignment of the antenna.

Figure 4:
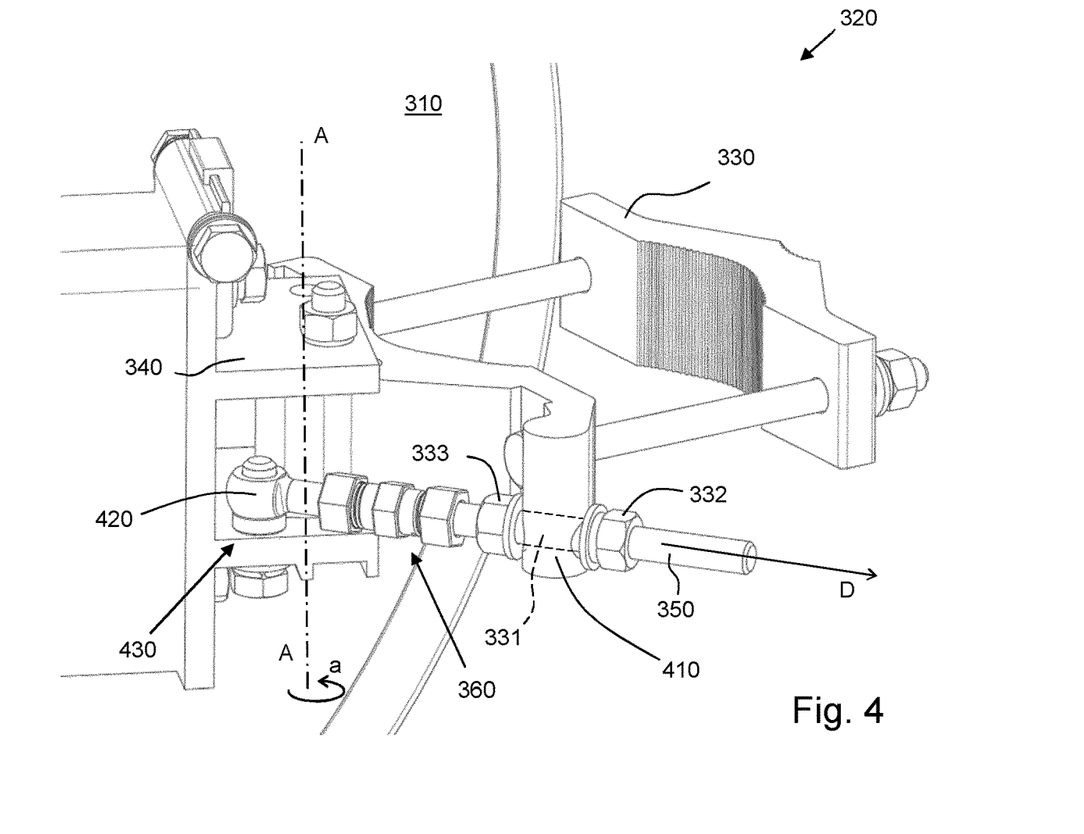

The adjustment of the antenna pointing direction by the locking nuts alone provides a relative course mechanism for antenna alignment. Also, the antenna pointing direction is likely to change a little bit when the locking nuts are tightened, which results in an unwanted adjustment error. It has been realized that a differential screw mechanism 360 can be used with advantage together with antenna mounting brackets for microwave radio link antennas. An example differential screw mechanism is shown in FIG. 4 and will be discussed in more detail below in connection to FIGS. 5A, 5B and 6. However, it is again reiterated that other types of differential screw mechanisms can be used in a similar manner with mounting brackets for microwave radio links antennas.

An example of the alignment member 350 and the differential screw mechanism 360 is illustrated in FIG. 4. The alignment member 350 extends in an elongation direction D between an attachment point 410 on the fixed part 330 and an attachment point 420 on the pivotable part 340, where the elongation direction D is nonparallel with the first pivoting axis A and where both attachment points 410, 420 are offset from the first pivoting axis A. The second attachment point here comprises an articulated joint which allows the alignment member 350 to pivot about the attachment point 420 on the pivotable part 340. Of course, the example alignment member mechanism shown in FIG. 4 can also be turned around, such that the end portion of the alignment member 350 is pivotably attached to the fixed part 330 and extends through a hole formed in the pivotable part.

Now, if the pivotable part is pivoted about the pivoting axis A, the threaded rod constituting part of the alignment member 350 will move back and forth in the hole formed in the fixed part 330 at the first attachment point 410. Once a suitable alignment angle has been found, the threaded rod can be fixed in the hole, thereby securing the pivotable part with respect to the fixed part. As already noted above, this mechanism represents a course adjustment mechanism. The differential screw mechanism 360 illustrated in FIG. 4 can be used to adjust the length of the threaded rod comprised as part of the alignment member 360. This means that the differential screw mechanism constitutes a fine adjustment mechanism, which can be used to fine-tune the alignment of the antenna with higher precision compared to when using the coarse alignment mechanism only. In other words, the antenna mounting bracket optionally comprises a primary pivoting angle adjustment mechanism and a secondary pivoting angle adjustment mechanism, where the primary pivoting angle adjustment mechanism is configured for course adjustment of the pivoting angle a, and where the differential screw mechanism forms part of the secondary adjustment mechanism which is configured for fine adjustment of the pivoting angle a.

Herein, the terms course adjustment and fine adjustment are to be construed in a relative sense. A course adjustment of angle is one where a relatively large span or range of angles can be covered, but where the exact angle can only be configured with a relatively low precision. A fine adjustment is an adjustment which only covers a more limited range of angles, but where the exact angle can be determined with higher precision compared to the course adjustment. As an example, the range of antenna pointing angles which can be covered by a course adjustment mechanism may be on the order of 40 degrees or so, while the range of angles which can be covered by the fine adjustment mechanism may be on the order of 1-5 degrees or so.

In some cases the rotation of the differential screw mechanism may cause a rotation of one of the threaded portions, and in particular the part which extends through the hole formed in the fixed part 330 if this part is not firmly fixed in the hole. To prevent such unwanted rotation by the alignment member, the alignment member 350 optionally comprises an at least partially threaded rod extending through an aperture formed in the pivotable part 340, where the aperture and the rod are asymmetrically formed to prevent rotation by the rod in the aperture. This may, e.g., comprise a slot or flat surface extending longitudinally along the alignment member, with a tap or protrusion formed in the hole 331 of the fixed part which cooperates with the slot to prevent rotation of the rod in the hole.

Figure 5A:
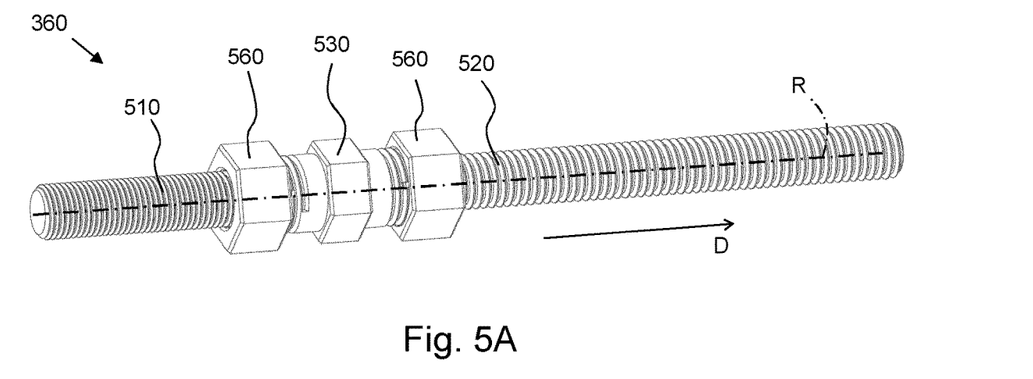
FIGS. 5A-B shows a differential screw mechanism.
Figure 5B:
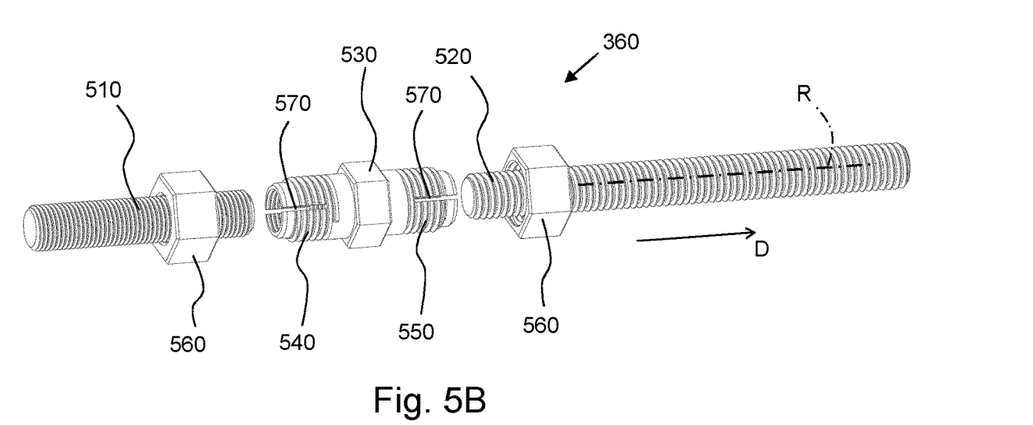
Figure 6:
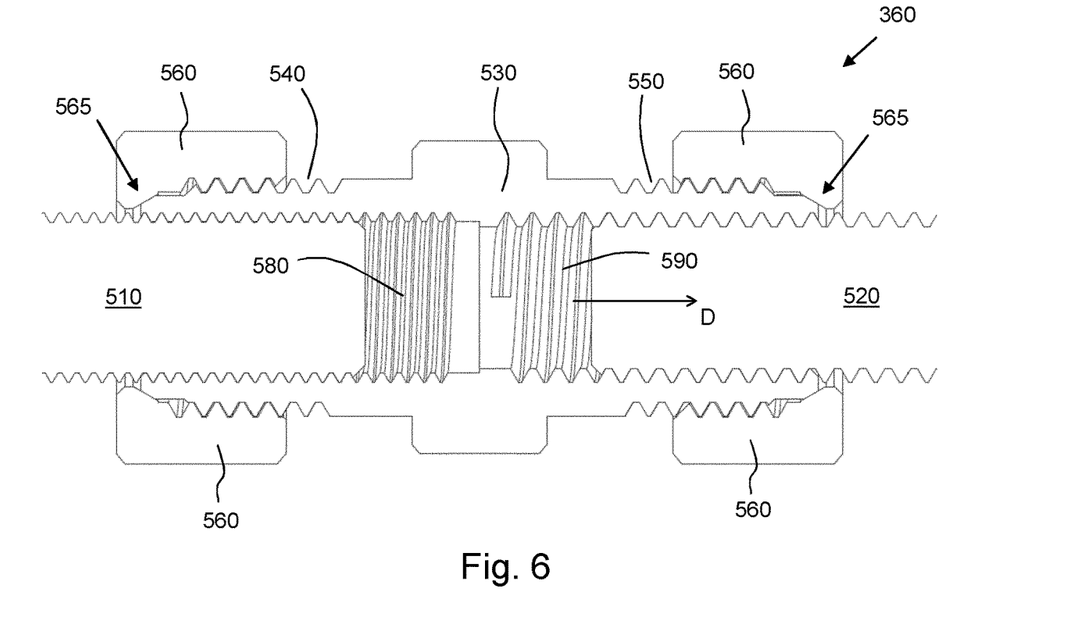
FIG. 6 is a cross-sectional view of a differential screw mechanism.

FIGS. 5A, 5B and 6 illustrate an example differential screw mechanism which may be used with advantage together with a mounting bracket for a microwave radio link antenna. This example differential screw mechanism 360 comprises a first 510 and a second 520 externally threaded portion arranged to mate with respective internally threaded portions of a joining member 530. The joining member 530 is an internally threaded sleeve, as shown in FIG. 6, where the internal threads are configured with a pitch different that determines the precision of the differential screw mechanism, i.e., how much the rod extends for each turn of the sleeve. As shown in FIG. 6, the first threaded portion has a somewhat finer pitch 580 compared to the pitch 590 of the second threaded portion 520. For single start threads as shown in FIG. 6, each turn changes the length of the alignment member by the effective pitch, $P_{eff}$. For a bolt with a given thread per inch, $TPI_1$ on one end and a second thread per inch, $TPI_2$ on the other, the change in distance (or $P_{eff}$), and the effective thread per inch $TPI_{eff}$, is determined as $$\frac{1}{TPI_1} - \frac{1}{TPI_2} = \frac{1}{TPI_{eff}} = P_{eff}$$

The pitch difference of the differential screw mechanism is preferably somewhere between 0.05 mm and 1.5 mm, although other pitch differences can certainly be used.

The friction provided by the sleeve alone may very well be sufficient for securing the differential screw mechanism. However, optionally, the joining member 530 also comprises externally threaded portions 540, 550 arranged to mate with respective locking nuts 560, where the externally threaded portions are arranged compressible 570 by the locking nuts 560 to provide a prevailing torque of the threaded portions 510, 520. The differential screw locking nuts 560 are not to be confused with the course adjustment locking nuts 332, 333 discussed in connection to FIG. 4 above.

As can be seen in FIG. 5B, slits are formed in the sleeve which allow the locking nuts to compress the joining member sleeve against the first 510 and a second 520 externally threaded portions. The slits are cut in the extension direction D of the sleeve, as illustrated in FIG. 5B. Two or more slits may be formed in either side of the joining member 560. This compression of the sleeve generates a prevailing torque which secures the differential screw mechanism and prevents it from moving once locked in place by the locking nuts 560.

With reference mainly to FIG. 6, the locking nuts 560 may furthermore comprise angled portions 565 configured to engage with corresponding portions of the sleeve. The angled portions are shaped so as to compress the sleeve radially inwards to enforce the prevailing torque. The locking nuts 560 may also comprise a leading chamfer (not shown in FIG. 6) which simplify the locking nut entering onto the sleeve to engage the sleeve of the joining member 530 in locking position.

An advantage associated with the design in FIGS. 5A, 5B and 6 is that the securing of the locking nuts 560 does not rotate the differential screw mechanism and therefore does not affect antenna alignment.

The joining member 530 optionally also comprises a section arranged to mate with a tool configured to rotate the joining member about an axis of rotation R parallel to the extension direction D. This section is exemplified in FIGS. 5A and 5B by a hexagonal nut which is configured to mate with a regular wrench or spanner tool. A technician wanting to perform a fine-tuning of antenna alignment may simply turn the joining member 530 by a spanner about the axis of rotation R. Every turn of the joining member will generate a change in the length of the alignment member, which in turn generate a small change in alignment angle. The dimension of the section arranged to mate with the tool configured to rotate the joining member about an axis of rotation R is preferably the same dimension as that of the locking nuts 560, and also the same as that of the course adjustment locking nuts 332, 333.

According to some aspects, the differential screw mechanism 360 comprises a visible scale configured to indicate a state of the differential screw mechanism. This means that the technician performing the fine-tuning of adjustment angle can keep track of how much the angle has been changed. Often, the radio equipment provides some form of feedback indicating an SNR or other quality metric o the radio link. The technician may then use the scale to see how much the radio links alignment has been changed from some nominal position, and what the resulting difference in alignment metric was. The visible scale may be machined into the differential screw mechanism or printed onto the differential screw mechanism.

Figure 7:
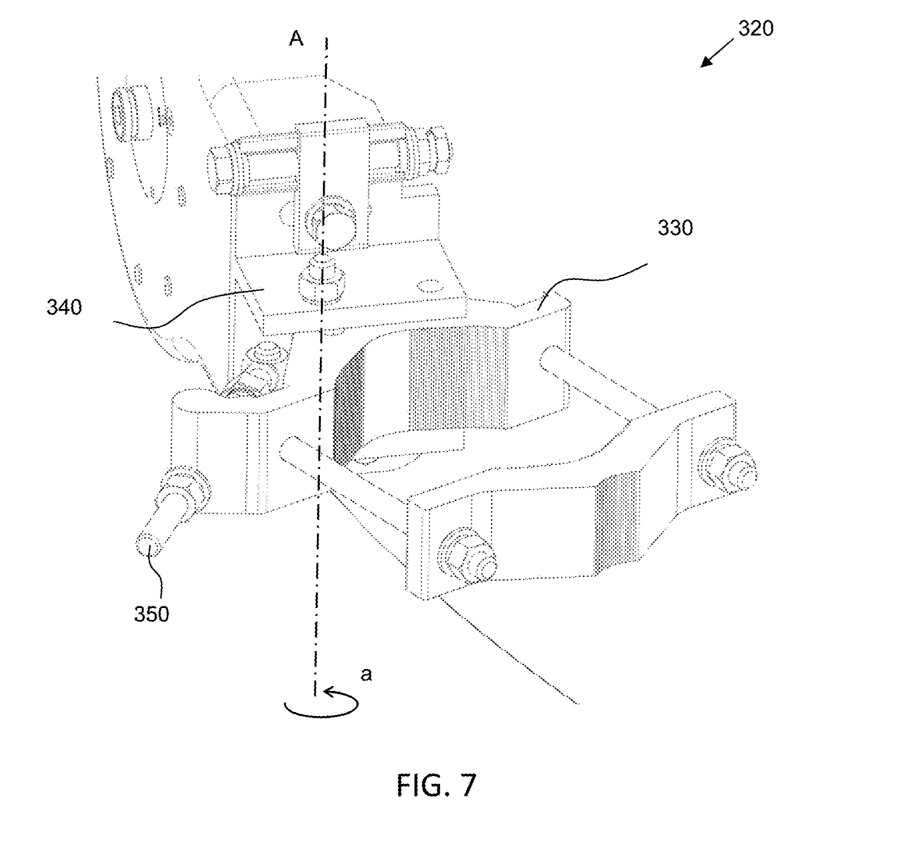
FIG. 7 illustrates details of an example mounting bracket.

FIG. 7 shows a view of an example mounting bracket, where the pivotable part 340 is also pivotably attached to the fixed part 330 about a second pivoting axis different from the first pivoting axis A. This allows the pointing direction to be changed in two dimensions, e.g., azimuth and altitude. The adjustment mechanism for adjusting pointing angle about the second pivoting axis may or may not comprise a differential screw mechanism.

FIG. 7 is a flow chart which illustrates a method for aligning an antenna by means of the herein disclosed antenna brackets. The method comprises obtaining Sa1 an antenna mounting bracket 220, 320 for pivotably mounting a directional antenna 210, 310 to a fixed structure 250, the antenna mounting bracket comprising an fixed part 330 arranged to be attached to the fixed structure 250 and an pivotable part 340 arranged to hold the directional antenna 210, 310, wherein the pivotable part 340 is pivotably attached to the fixed part 330 about a first pivoting axis A, and where a pivoting angle a of the pivotable part 340 relative to the fixed part 330 is arranged to be controlled by an alignment member comprising a differential screw mechanism 360, attaching Sa2 the fixed part 330 to fixed structure, attaching Sa3 the pivotable part 340 to a directive microwave antenna, performing Sa4 a course adjustment by pivoting the pivotable part 340 relative to the fixed part 330, and performing Sa5 a fine adjustment by means of the differential screw mechanism 360.

Figure 8:
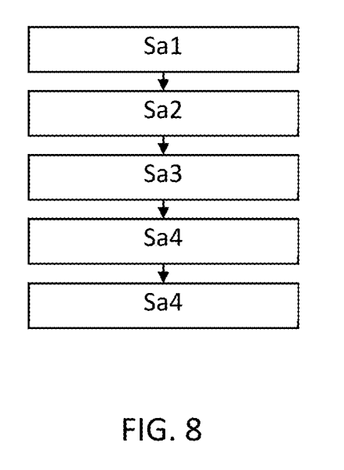
FIGS. 8-9 are flow charts illustrating methods.
Figure 9:
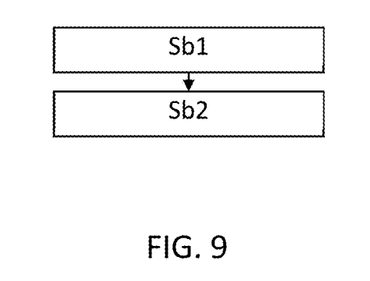

FIG. 8 is a flow chart which illustrates a method for adapting an antenna mounting bracket to support high accuracy alignment, comprising obtaining Sb1 an antenna mounting bracket 220, 320 for pivotably mounting a directional antenna 210, 310 to a fixed structure 250, the antenna mounting bracket comprising an fixed part 330 arranged to be attached to the fixed structure 250 and an pivotable part 340 arranged to hold the directional antenna 210, 310, wherein the pivotable part 340 is pivotably attached to the fixed part 330 about a first pivoting axis A, and where a pivoting angle a of the pivotable part 340 relative to the fixed part 330 is arranged to be controlled by an alignment member, the method also comprising replacing Sb2 the alignment member by an alignment member 350 comprising a differential screw mechanism 360. This way an existing antenna mounting bracket can be updated to comprise the fine-tuning capability provided by the differential screw mechanism.

The invention claimed is:

1. An antenna mounting bracket for pivotably mounting a directional antenna to a fixed structure, the antenna mounting bracket comprising a fixed part arranged to be attached to the fixed structure and a pivotable part arranged to hold the directional antenna,
   wherein the pivotable part is pivotably attached to the fixed part about a first pivoting axis (A), and
   where a pivoting angle (a) of the pivotable part relative to the fixed part is arranged to be controlled by an alignment member comprising a differential screw mechanism wherein the differential screw mechanism comprises a first and a second externally threaded portion arranged to mate with respective internally threaded portions of a joining member.

2. The antenna mounting bracket according to claim 1, where the fixed part is arranged to be attached to any of an antenna mast, a building, or a fixed object in a traffic infrastructure.

3. The antenna mounting bracket according to claim 1, where the pivotable part is arranged to hold one or more directive microwave disc antennas and/or one or more directive microwave antenna arrays.

4. The antenna mounting bracket according to claim 1, where the alignment member extends in an elongation direction (D) between an attachment point on the fixed part and an attachment point on the pivotable part, where the elongation direction (D) is nonparallel with the first pivoting axis (A) and where both attachment points are offset from the first pivoting axis (A).

5. The antenna mounting bracket according to claim 1, comprising a primary pivoting angle adjustment mechanism and a secondary pivoting angle adjustment mechanism, where the primary pivoting angle adjustment mechanism is configured for coarse adjustment of the pivoting angle (a), and where the differential screw mechanism forms part of the secondary adjustment mechanism which is configured for fine adjustment of the pivoting angle (a).

6. The antenna mounting bracket according to claim 1, where the joining member comprises externally threaded portions arranged to mate with respective locking nuts, where the externally threaded portions are arranged compressible by the locking nuts to provide a prevailing torque of the threaded portions.

7. The antenna mounting bracket according to claim 1, where the joining member comprises a section arranged to mate with a tool configured to rotate the joining member about an axis of rotation (R) parallel to the extension direction (D).

8. The antenna mounting bracket according to claim 1, wherein a pitch difference of the differential screw mechanism is between 0.05 mm and 1.5 mm.

9. The antenna mounting bracket according to claim 1, where the differential screw mechanism comprises a visible scale configured to indicate a state of the differential screw mechanism.

10. The antenna mounting bracket according to claim 1, wherein an end portion of the alignment member is pivotably attached to the pivotable part and/or to the fixed part.

11. The antenna mounting bracket according to claim 1, wherein the pivotable part is also pivotably attached to the fixed part about a second pivoting axis different from the first pivoting axis (A).

12. The antenna mounting bracket according to claim 1, wherein the alignment member comprises an at least partially threaded rod extending through an aperture formed in the pivotable part, where the aperture and the rod are asymmetrically formed to prevent rotation by the rod in the aperture.

13. A method for aligning an antenna, the method comprising:
   obtaining an antenna mounting bracket for pivotably mounting a directional antenna to a fixed structure, the antenna mounting bracket comprising a fixed part arranged to be attached to the fixed structure and a pivotable part arranged to hold the directional antenna, wherein the pivotable part is pivotably attached to the fixed part about a first pivoting axis (A), and where a pivoting angle (a) of the pivotable part relative to the fixed part is arranged to be controlled by an alignment member comprising a differential screw mechanism wherein the differential screw mechanism comprises a first and a second externally threaded portion arranged to mate with respective internally threaded portions of a joining member,
   attaching the fixed part to a fixed structure,
   attaching the pivotable part to a directive microwave antenna,
   performing a coarse adjustment by pivoting the pivotable part relative to the fixed part, and
   performing a fine adjustment by means of the differential screw mechanism.

14. A method for adapting an antenna mounting bracket to support high accuracy alignment, comprising:
   obtaining an antenna mounting bracket for pivotably mounting a directional antenna to a fixed structure, the antenna mounting bracket comprising a fixed part arranged to be attached to the fixed structure and a pivotable part arranged to hold the directional antenna, wherein the pivotable part is pivotably attached to the fixed part about a first pivoting axis (A), and where a pivoting angle (a) of the pivotable part relative to the fixed part is arranged to be controlled by an alignment member without a differential screw mechanism, the method also comprising:
   replacing the alignment member without a differential screw mechanism by an alignment member comprising a differential screw mechanism wherein the differential screw mechanism comprises a first and a second externally threaded portion arranged to mate with respective internally threaded portions of a joining member.

\* \* \* \* \*